Loper & Nystrom,
Reciprocating Steam Engine,

№ 7,842.  Patented Dec. 17, 1850.

UNITED STATES PATENT OFFICE.

RICHARD F. LOPER AND J. W. NYSTROM, OF PHILADELPHIA, PENNSYLVANIA.

ARRANGEMENT OF STEAM-ENGINES.

Specification of Letters Patent No. 7,842, dated December 17, 1850.

*To all whom it may concern:*

Be it known that we, RICHARD F. LOPER and JOHN WILLIAM NYSTROM, of the city and county of Philadelphia and State of Pennsylvania, have invented a new and useful improvement in steam-engines particularly applicable to screw-propeller engines, where it is desirable to cause the propeller to revolve a greater number of times than the number of double strokes made by the engine; and we do hereby declare that the following is a full, clear, and exact description of our invention, reference being had to the accompanying drawing, which forms part of this specification and in which—

Figure 1:
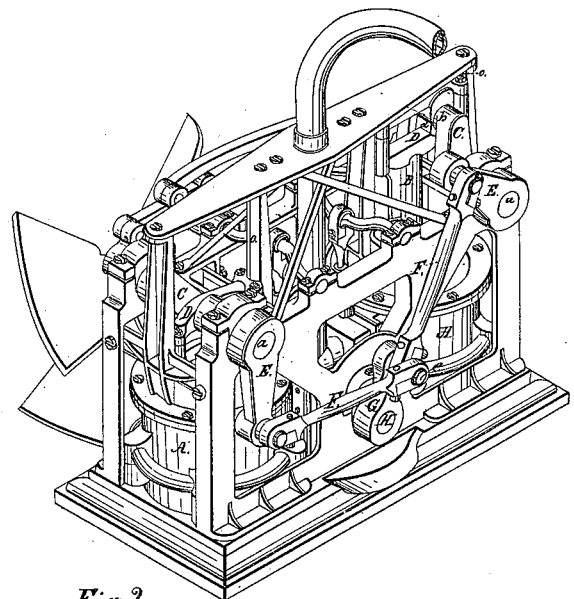
Figure 2:
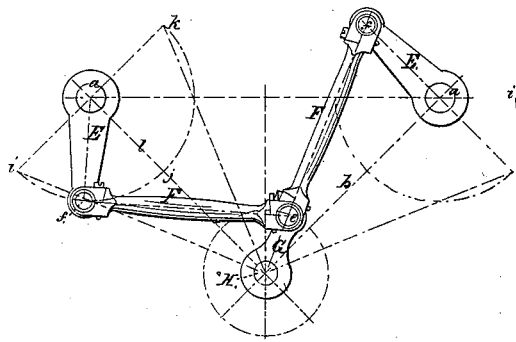
Figure 3:
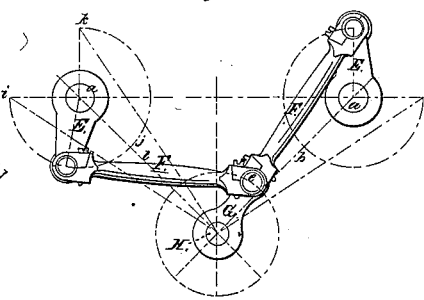

Figure 1 represents a view in perspective of a double cylinder propeller engine constructed according to the principle of our invention and Figs. 2 and 3 are elevations of the cranks, connecting rods, and beams of two such double engines detached from the other portions.

Our invention consists in a particular arrangement of the beams, connecting rods, and crank shaft of the two cylinders of a double cylinder engine by which the crank shaft is forced to make a complete revolution while the piston of one engine is making a single stroke or is traveling from one end of the cylinder to the other, while at the same time the arrangement of the various parts is such that the crank to which the two connecting rods are applied cannot be placed in any position in which the power acting upon one of the connecting rods is not tending to turn it. The crank shaft of our engine therefore makes twice as many revolutions as that of engines of the usual construction in which this shaft makes but one revolution for each double stroke of the piston, while at the same time this increase in speed is obtained without the employment of cog gearing or of any similar device.

In the accompanying drawing A, A, are the steam cylinders of the engine each of which is fitted with a suitable piston whose rod B, B, passes through a stuffing box in the head of the cylinder. The outer extremity of each of these piston rods is connected with the outer end of a half beam C, C, which is secured to a short shaft or center *a a*. This connection must be such that while the piston rod moves to and fro in a straight line, the pin *b, b*, of the beam with which it is connected shall describe an arc of a circle of which the axis of the beam-center (*a a*) is the center. This connection may be made by links as in ordinary lever beam engines or the links may be dispensed with and the connection may be made in the manner represented at Fig. 1 by securing a framed or open crosshead D, D, to the outer extremity of the piston rod and fitting a brass box *d, d*, to slide therein. This box embraces the pin of the beam and slides in the crosshead at right angles with the piston rod to accommodate itself to the varying positions of the beam pin as the piston is moved to and fro while the crosshead is fitted at its extremities with guide brakes which running on stationary guides *o o* force the piston rod to move in a straight line. A second half beam E, E, is secured to the beam center *a, a*, and is connected by a connecting rod F, F, with the crank pin *e* of the crank G on the crank shaft H. This second beam E, E, must be set at such an angle with respect to the first beam C, C, that the beam pin *f* at its outer extremity will describe circular arcs *i j, j k* (Figs. 2 and 3) of equal length on each side of a line *l* drawn through the axis of the beam-center *a* and crank shaft H. The crank G must also be of such length that as the beam pin *f* travels through one of these arcs or from *i* to *j* it shall make a half revolution. The beam centers *a, a*, of the two steam cylinders are set in such positions with respect to each other and with respect to the crank shaft H that the lines *l, l*, which pass through their respective axes and the axis of the crank shaft shall make a right angle with each other, hence when one of the beam pins *f* is at the extremity of one of the two adjoining circular arcs described by it the other beam pin *f* will be at the middle of one of the circular arcs described by it, by which arrangement the steam in one at least of the cylinders will be tending to turn the crank in whatever position it may be placed. In Fig. 2 the half beams are so proportioned with respect to the stroke of the piston that they shall describe a complete semicircle at each stroke while at Fig. 3 they are represented as constructed to describe three quarters of a circle at each stroke of the piston.

It will be obvious to the skillful mechanic that the most advantageous respective positions of the beam centers and crank shaft will be that represented in the annexed drawing where the lines $l, l,$ passing through their respective axes form a right angle with each other. The nearer they approach these positions the more advantageous will be the result, and though the construction of other portions of the engine may sometimes render it expedient to vary these positions yet we prefer to arrange them as above mentioned whenever possible.

As the crank shaft makes a half revolution whenever the beam pin moves from one extremity to the other of the circular arc described by it on each side of the central line $l$ and as at each stroke of the piston the beam pin $f$ describes two of such circular arcs, it follows that the crank shaft will describe a complete revolution for each stroke of the piston, or two revolutions for each double stroke while at the same time as one or other piston is always acting to turn the crank the latter will not tend to hang upon the dead points but will revolve in an equable manner.

What we claim as our invention and desire to secure by Letters Patent is—

The arrangement herein set forth of the beams, connecting rods, and crank of the two cylinders of a double cylinder engine, In testimony whereof we have hereunto subscribed our names.

RICHARD F. LOPER.
JOHN W. NYSTROM.

Witnesses:
IRA BROWN,
STEPHEN N. SIMMONS.